(12) United States Patent
Riegel et al.

(10) Patent No.: US 8,354,944 B2
(45) Date of Patent: Jan. 15, 2013

(54) NIGHT VISION DEVICE

(75) Inventors: Thilo Riegel, Ludwigsburg (DE);
Rainer Moritz, Filderstadt (DE); Uwe Beutnagel-Buchner, Stuttgart (DE); Jan Egelhaaf, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 677 days.

(21) Appl. No.: 11/992,440

(22) PCT Filed: Aug. 18, 2006

(86) PCT No.: PCT/EP2006/065456
§ 371 (c)(1),
(2), (4) Date: Mar. 25, 2009

(87) PCT Pub. No.: WO2007/036397
PCT Pub. Date: Apr. 5, 2007

(65) Prior Publication Data
US 2009/0195414 A1      Aug. 6, 2009

(30) Foreign Application Priority Data
Sep. 29, 2005 (DE) .......................... 10 2005 046 672

(51) Int. Cl.
*G08G 1/123* (2006.01)

(52) U.S. Cl. .................... 340/995.19; 340/435; 340/990

(58) Field of Classification Search ............. 340/995.19, 340/995.14–995.15, 995.17–995.18, 995.21–995.28, 340/903, 907, 990, 435
See application file for complete search history.

(56) References Cited

U.S. PATENT DOCUMENTS

| | | | | |
|---|---|---|---|---|
| 5,711,025 | A | * | 1/1998 | Eckert et al. ................. 701/83 |
| 6,281,804 | B1 | * | 8/2001 | Haller et al. ................. 340/901 |
| 6,553,130 | B1 | * | 4/2003 | Lemelson et al. ............ 382/104 |
| 6,741,186 | B2 | * | 5/2004 | Ross ............................. 340/901 |
| 6,947,064 | B1 | * | 9/2005 | Hahn et al. ................... 701/301 |
| 7,021,791 | B1 | * | 4/2006 | Kobayashi ................... 362/212 |
| 7,045,783 | B2 | * | 5/2006 | Matveev ....................... 250/330 |
| 8,016,595 | B2 | * | 9/2011 | Aoki et al. .................... 434/61 |
| 2003/0026456 | A1 | * | 2/2003 | Akutagawa .................. 382/104 |
| 2004/0022416 | A1 | * | 2/2004 | Lemelson et al. ............ 382/104 |
| 2004/0236506 | A1 | | 11/2004 | Kolb et al. |
| 2004/0240221 | A1 | * | 12/2004 | Choi ............................ 362/510 |

FOREIGN PATENT DOCUMENTS

| | | |
|---|---|---|
| DE | 102 53 510 | 5/2004 |
| EP | 1 407 937 | 4/2004 |
| EP | 1407931 | 4/2004 |
| WO | 03/017226 | 2/2003 |

* cited by examiner

*Primary Examiner* — Daniel Previl
(74) *Attorney, Agent, or Firm* — Kenyon & Kenyon LLP

(57) ABSTRACT

A night vision device for a vehicle is provided, in which a travel path that is set or is to be set is inserted in an image recorded by a camera, the travel path being determined from an evaluation of a location-finding or travel direction sensor.

16 Claims, 2 Drawing Sheets

NIGHT VISION DEVICE

FIELD OF THE INVENTION

The present invention is based on a night vision device.

BACKGROUND INFORMATION

A device for improving visibility in a motor vehicle is already discussed in DE 102 53 510. Driver information regarding the course of the roadway and/or regarding objects in the vicinity of the motor vehicle are displayed to the driver of the motor vehicle via a signaling arrangement, for example, a monitor or a head-up display. An infrared-sensitive image-sensor system is provided to detect the course of the roadway, the signals of this system being processed such that relevant markings for delimiting the course of the roadway are faded into the display.

SUMMARY OF THE INVENTION

In contrast to this, the night vision device according to the present invention having the features of the main claim has the advantage that a travel path that is set or is to be set for the motor vehicle is determined by a position-finding and/or a travel-direction sensor. Through this it is possible to provide to the driver optical support for a display of a night-vision scenery in front of the vehicle even without an optical evaluation of the travel situation in front of the vehicle. Consequently, it is also possible to provide to the driver such information at times when an image evaluation is not possible, for example, due to precipitation, poor visibility, or missing street markings. In particular, it is advantageous to support the driver during a night drive by evaluating only data determined by a vehicle sensor system itself, without requiring an optical image evaluation that for the most part involves a high degree of computation.

The measures specified in the dependent claims make possible advantageous refinements and improvements to the night vision device described in the main claim. It is particularly advantageous that the travel direction sensor is a steering angle sensor. Thus, it is possible to use the steering angle currently set by the driver to predict a travel path. This is because the steering angle that is currently set may be faded into the course of the road immediately in front of the vehicle to project the course of the roadway. The driver may thus recognize at which distance he will pass an edge of the road or obstacles. Thus, he may also recognize whether a steering correction is necessary. This is advantageous particularly if the driver, due to poor visibility conditions, is able to estimate even distances to lateral obstacles only poorly.

Furthermore, it is advantageous to use a position-finding sensor to determine a current position of the vehicle and to determine, for example, from a comparison to a digital map or an evaluation of a change in position, the course of the road in front of the vehicle or the travel direction being followed. This course of the road, which the vehicle must follow in its further travel, may accordingly be faded into the display. This makes it in particular possible to warn the driver in a timely manner about sharp curves or similar hazardous areas, since a corresponding course of the road may be plotted on the display in advance. In this case, it is in particular advantageous to fade in the course of the road additionally into a map display. This allows the driver, above all taking into consideration the current position of the vehicle, to recognize the course of the road in its entirety and adjust his driving behavior accordingly.

It is furthermore advantageous to additionally provide the possibility that the night-vision device determines the course of roadway boundaries and/or markings from a recorded camera image and may also highlight these in the display. In comparison to the other markings determined by the sensor system, a comparison between the optically recorded markings and the markings recorded by other arrangements is thus able to be performed by the driver. He may thus also assess whether a good recording of the travel path in front of the vehicle has actually been carried out, or whether the support is possibly faulty. If the set travel path is compared to a travel path to be set, the driver is able to recognize whether the steering wheel is correctly set to follow the travel path to be set.

It is furthermore advantageous to fade into the display at least one additional warning or notice signal. Through this, the driver may be made aware of curves, potentially hazardous road areas, or also of a turn he has to make.

It is furthermore advantageous to provide an operating unit with which the driver may select his desired display of the travel path that has been set or that is to be set. Depending on his wishes, he may in the process include more or fewer help displays in the display.

Exemplary embodiments of the present invention are illustrated in the drawing and explained in detail in the following description.

DETAILED DESCRIPTION

Figure 1:
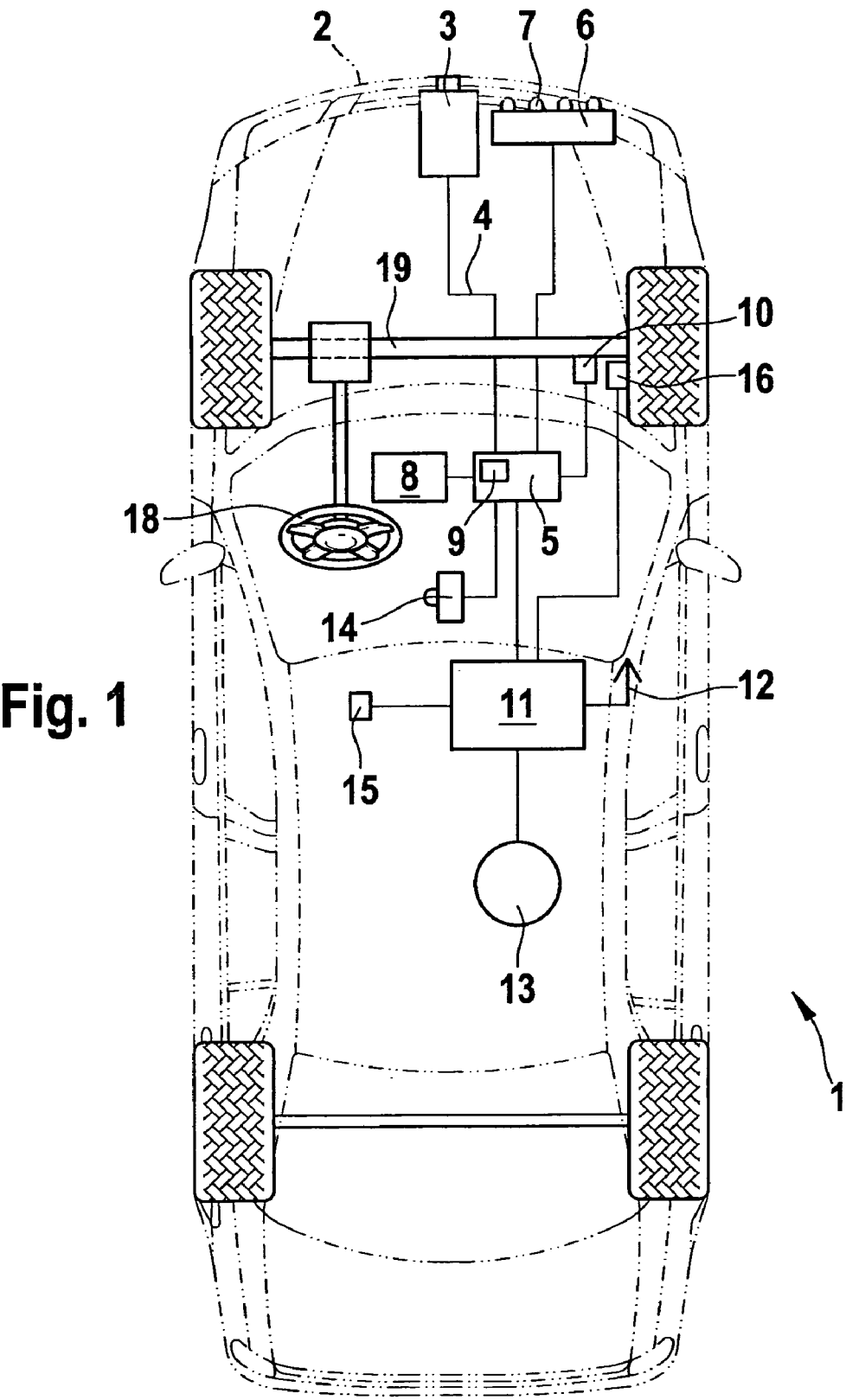
FIG. 1 shows, in a schematic top view, a night-vision device according to the present invention in a vehicle

FIG. 1 shows a schematic top view of a motor vehicle 1. On a front side 2 of vehicle 1, a camera 3 is situated such that camera 3 monitors the driving space in front of vehicle 1. Camera 3 is in particular implemented as an electronic camera device that covers the near-infrared range in addition to the wave-length area visible to the human eye. Camera 3 may be sensitive to a wave-length range between 400 and 980 nm. To this end, camera 3 is implemented as a CCD camera, for example. Image data are transmitted to an evaluation unit 5 in vehicle 1 via a video line or a video data bus line 4. To better illuminate the scenery in front of vehicle 1, an illumination device 6 is provided in one specific embodiment, in which infrared light sources 7, for example, infrared-light-emitting diodes, emit light into the driving space in front of vehicle 1.

Illumination device 6 is, for example, triggered by evaluation unit 5. Evaluation unit 5 contains a processing unit 9 that, in one exemplary embodiment, enables an image processing of the recorded image data. The image data are forwarded by evaluation unit 5 to a display unit 8 in the vehicle. Display unit 8 is, for example, implemented in the vehicle as what is known as a head-up display. In this case, a virtual image of the driving situation in front of the vehicle is projected onto a windshield or onto a projection unit in front of the driver. One particular specific embodiment has what is known as a contact analog display, in which the projected image elements overlap with the scenery in front of the vehicle that is visible to the driver through the windshield such that the faded-in markings appear to be in front of him in relation to the real objects. In an additional specific embodiment, display unit 8 may also be implemented as a display in an instrument cluster or in a center console of the vehicle. In this case, the corresponding scenery in front of the vehicle is shown on a screen.

In a first specific embodiment, evaluation unit 5 is connected to a steering angle sensor 10 that determines a steering angle of front axle 19. The steering angle is set by the driver via steering wheel 18. As a function of the currently set steering angle detected via steering angle sensor 10, evaluation unit 5 calculates a travel path that the vehicle will follow if the set steering angle remains unchanged. This travel path is faded into the image taken by camera 3 with the aid of markings. Thus, the driver may recognize the travel path in front of the vehicle.

In an additional specific embodiment, evaluation unit 5 is connected to a position-finding device 11. Position-finding device 11 has in particular an antenna 12 that performs a satellite position finding. A movement vector may thus initially be determined from the change in the location position. Likewise, from this movement vector, a current travel path set by the vehicle may be determined and represented in the display. In an alternative specific embodiment, position finding in the sense of an ascertainment of a position change may be determined using a wheel sensor 16 and a rotation-rate sensor 15. Alternatively, these sensors may also be used to support the satellite arrangement (position) in the event that no satellite reception is possible.

In an additional specific embodiment, the position-finding unit may also access a road map basis 13. This road map basis 13 is, for example, a digital map of a road network stored in a memory. By position-finding device 11 ascertaining the current position of the vehicle and comparing it to the stored road map basis 13, the position-finding unit may determine a position of the vehicle on a road. With this, it is then also possible to call up the further course of the road from the road map basis. This course of the road is transmitted to evaluation unit 5. Evaluation unit 5 now depicts the further course of the road starting from the current position of the vehicle, likewise superimposed on the current driving situation, in display unit 8.

Evaluation unit 5 is additionally connected to an operating unit 14. Operating unit 14 may activate camera 3, but also inform evaluation unit 5 which additional markings should be depicted in display 8. Thus, the set travel path detected by the steering-angle sensor, the travel path specified by the location-finding unit, or the travel path to be set as specified by the location-finding unit in conjunction with the roadmap, may each be selected separately but also in combination. Additionally, as a supplement to this, it is also possible to especially highlight the roadway boundaries or roadway markings determined from the detected image signal by evaluation unit 5 using processing unit 9 by fading in additional symbols in display 8.

Camera 3 may record the scenery in front of the vehicle both during the day and at night. In particular, however, its use as a night-vision device is advantageous since at night it is particularly difficult for a driver, especially when visibility conditions are bad, to recognize the course of the roadway in front of him.

Figure 2:
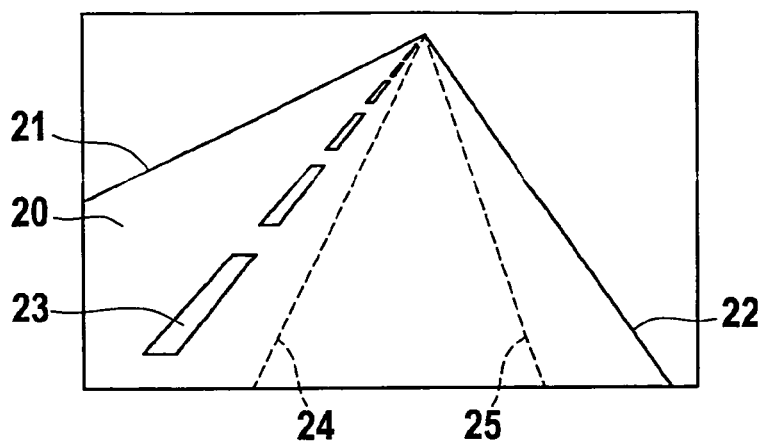
FIG. 2 shows an exemplary embodiment for display views of a night-vision device according to the present invention.

FIG. 2 shows a first exemplary embodiment of a view in display 8. A left-hand-side edge of the roadway 21, a right-hand-side edge of the roadway 22, and a roadway 20 situated in the middle, including median strip markings 23, are visible to the driver in the image recorded by camera 3 and shown in display unit 8. If the image is displayed in a head-up display having a contact-analog display, the position of the camera image is to be adjusted to the actual form of the surroundings in front of the vehicle, as it is visible to the driver through the windshield.

The traffic lane that the vehicle should take runs between the right-hand-side edge of the road 22 and median strip 23. In the exemplary embodiment shown here, a dashed line 24 on the left hand side and a dashed line 25 on the right hand side mark a traffic lane, which is determined based on the steering angle currently set for the vehicle. The driver may thus recognize that without a change in the steering angle he is currently driving the vehicle on the specified roadway or in the specified traffic lane. If an obstacle were now to appear in the area of roadway 20, the driver could recognize whether the traffic lane set by him progresses around the obstacle or whether he must correct the set steering angle. In this way, he could also recognize whether a pothole lies in his path and whether he should avoid it. If the road curves to the right or to the left, the driver would have to correct the set steering angle with steering wheel 18. Accordingly, the displayed markings 24, 25 would then tilt right or left according to the rotation of the steering wheel. Instead of a pure side boundary display, as shown here by the markings 24, 25, it would also be possible to insert a traffic lane delimited by markings 24, 25 completely into the display image through a large-scale marking. Furthermore, it would also be possible to insert a traffic lane into the display as a double lane according to the course of the wheels. Such a display could be achieved, for example, by a corresponding, respective broadening of the markings 24, 25 toward the inside of the traffic lane.

Figure 3:
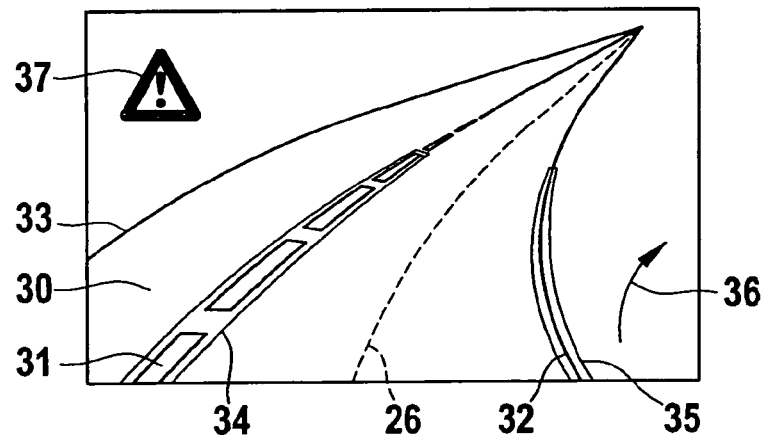
FIG. 3 shows another exemplary embodiment for display views of a night-vision device according to the present invention.

FIG. 3 shows an additional exemplary embodiment of a view in display unit 8. In the present case, a line 26 is inserted centrally in a traffic lane between a central lane marking 31 and a right-hand-side edge of the roadway 32. Additionally, a left-hand-side traffic lane boundary 33 and roadway 30 itself are depicted in the display. In addition, the course of central lane marking 31 and right-hand-side edge of the roadway 32 were calculated through an analysis of the camera image. For this reason, in accordance with an exemplary embodiment, markings 34 for highlighting the median strip and markings 35 for highlighting the right-hand-side boundary of the roadway were additionally inserted into the display image. By comparing the set travel path according to line 26 to the roadway boundaries 32, 34 determined from the image analysis, the driver is able to recognize the degree to which he is situated in the traffic lane.

In an additional exemplary embodiment, the central marking in the form of line 26 may also be determined, based on the current position of the vehicle, from a course of the road. First, the position of the vehicle in a road network is determined via position-finding device 11; after this, the expected course of the road is determined, in particular taking into consideration the travel direction of the vehicle, and plotted on the display device, corresponding to the view in FIG. 3. In the present case, starting from the current position of the vehicle, the road curves to the right. This may be recognized from the curve of the central line 26 to the right. In an additional specific embodiment, a reference symbol 36 may also be inserted into the display for support, thereby indicating to the driver a curve to the right. In special hazardous situations, a warning symbol 37 may additionally be faded into the display, which symbol likewise notifies the driver of a potentially dangerous stretch of road. This information may also be stored in the road map basis 13 for the relevant section of road.

Figure 4:
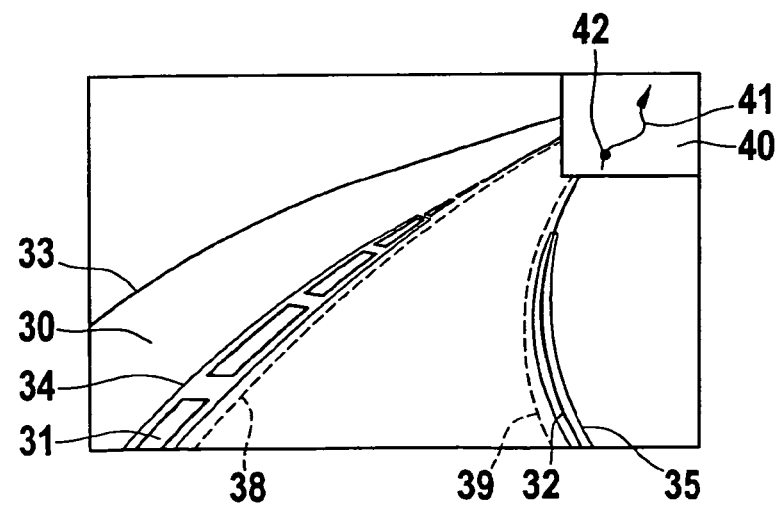
FIG. 4 shows another exemplary embodiment for display views of a night-vision device according to the present invention.

In an additional specific embodiment, instead of the display of a central marking, it is possible to insert a left-hand-side marking 38 and a right-hand-side marking 39 into the roadway 30, for a travel path determined from the road map basis. A corresponding view is shown in FIG. 4. Accordingly, it is also possible to plot both central marking 26, for example for a road course determined from the position-finding, and side markings 38, 39 for a road course determined from the set steering angle, simultaneously in the display.

Furthermore, FIG. 4 shows a view 40 of a course of road 41 that may also be used together with other exemplary embodiments. The course of road 41 is shown in the form of a map display or a small map section in the display. The course of road 41 is in this case shown in the travel direction for a particular section that goes beyond the current visual range of the driver. In one specific embodiment, a current position 42 of the vehicle is also plotted in relation to the course of road 41. In addition to fading it into display 8, it is also possible to provide the course of the road in an additional display. While, for example, the night-vision display is shown in an instrument cluster in front of the driver, map section 40 may be shown in a center console display. In an additional specific embodiment it is also possible to display each set route in map display 40 for a distance of up to approximately 1 km in front of the current position.

What is claimed is:

1. A night vision device for a vehicle, comprising:
   a camera for recording an image of an actual real-space driving situation in front of the vehicle; and
   a display for depicting the recorded image,
   wherein:
      at least one of a position-finding device and a travel direction sensor of the vehicle is evaluated to determine at least one of a travel path already set and a travel path to be set by the driver of the vehicle; and
      the depicting includes overlaying an image of the at least one of the travel path already set and the travel path to be set onto the recorded image of the actual real-space driving situation in front of the vehicle.

2. The night-vision device of claim 1, wherein the travel direction sensor is a steering angle sensor.

3. The night-vision device of claim 1, wherein the position-finding device is connected to a road map basis for determining a course of the road in front of the vehicle.

4. The night vision device of claim 3, wherein a course of the road is displayed in a map display.

5. The night-vision device of claim 4, wherein a current position of the vehicle is plotted on the course of the road.

6. The night vision device of claim 1, wherein the night vision device contains an evaluation unit for determining a course of at least one of roadway boundaries and markings from an image recorded by a camera.

7. The night vision device of claim 1, wherein at least one of an additional warning and a notice symbol may be displayed in the display.

8. The night vision device of claim 1, wherein there is an operating unit for selecting the information depicted in the display regarding the travel path.

9. A method for depicting a driving situation in front of a vehicle for a night vision device for the vehicle, the method comprising:
   recording an image of an actual real-space driving situation in front of the vehicle;
   evaluating at least one of a location-finding sensor and a travel direction sensor of the vehicle to determine at least one of a travel path already set and a travel path to be set by the driver for the vehicle; and
   for depicting the driving situation, overlaying in a display an image of the at least one of the travel path already set and the travel path to be set onto the recorded image of the actual real-space driving situation in front of the vehicle.

10. The method of claim 9, wherein the travel direction sensor is a steering angle sensor.

11. The method of claim 9, wherein the location-finding sensor is connected to a road map basis for determining a course of the road in front of the vehicle.

12. The method of claim 11, wherein a course of the road is displayed in a map display.

13. The method of claim 12, wherein a current position of the vehicle is plotted on the course of the road.

14. The method of claim 9, wherein the night vision device contains an evaluation unit for determining a course of at least one of roadway boundaries and markings from an image recorded by a camera.

15. The method of claim 9, wherein at least one of an additional warning and a notice symbol may be displayed in the display.

16. The method of claim 9, wherein there is an operating unit for selecting the information depicted in the display regarding the travel path.

* * * * *

UNITED STATES PATENT AND TRADEMARK OFFICE
CERTIFICATE OF CORRECTION

PATENT NO. : 8,354,944 B2  Page 1 of 1
APPLICATION NO. : 11/992440
DATED : January 15, 2013
INVENTOR(S) : Riegel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1180 days.

Signed and Sealed this
First Day of September, 2015

Michelle K. Lee
*Director of the United States Patent and Trademark Office*